US012711661B2

(12) United States Patent
Luo et al.

(10) Patent No.: US 12,711,661 B2
(45) Date of Patent: Aug. 18, 2026

(54) METHOD, APPARATUS, DEVICE AND MEDIUM FOR POSE ESTIMATION

(71) Applicant: Beijing Zitiao Network Technology Co., Ltd., Beijing (CN)

(72) Inventors: Yuxuan Luo, Beijing (CN); Yongming Zhu, Beijing (CN); Gaojie Lin, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 278 days.

(21) Appl. No.: 18/566,936

(22) PCT Filed: Jul. 19, 2022

(86) PCT No.: PCT/CN2022/106374
§ 371 (c)(1),
(2) Date: Dec. 4, 2023

(87) PCT Pub. No.: WO2023/005725
PCT Pub. Date: Feb. 2, 2023

(65) Prior Publication Data
US 2024/0144529 A1 May 2, 2024

(30) Foreign Application Priority Data
Jul. 29, 2021 (CN) ........................ 202110867074.5

(51) Int. Cl.
*G06T 7/73* (2017.01)
*G06T 7/246* (2017.01)

(52) U.S. Cl.
CPC ................ *G06T 7/74* (2017.01); *G06T 7/248* (2017.01); *G06T 2207/10016* (2013.01)

(58) Field of Classification Search
CPC ....................................................... G06T 7/74
See application file for complete search history.

(56) References Cited

U.S. PATENT DOCUMENTS

2015/0029222 A1* 1/2015 Hofmann .................. G06T 7/74 382/103
2016/0314398 A1 10/2016 Fei et al.
(Continued)

FOREIGN PATENT DOCUMENTS

CN 107851278 A 3/2018
CN 107909061 A 4/2018
(Continued)

OTHER PUBLICATIONS

Xiao, B., Wu, H., & Wei, Y. (2018). Simple baselines for human pose estimation and tracking. In Proceedings of the European conference on computer vision (ECCV) (pp. 466-481). (Year: 2018).*

(Continued)

*Primary Examiner* — Ian L Lemieux
(74) *Attorney, Agent, or Firm* — Astute IP Law Group

(57) ABSTRACT

A method, apparatus, device and medium for pose estimation. The method includes: determining, based on original feature points of a target object in a previous frame image to a current frame image, target feature points of the target object in the current frame image; determining effective feature points that meet a predetermined filtering condition from the target feature points, and generating a movement estimation model based on the effective feature points; generating a first pose of the target object in the current frame image based on the movement estimation model and pose estimation of the target object in the previous frame image, and extracting a second pose of the target object in the current frame image with a predetermined deep learning model; and smoothing the first pose and the second pose.

20 Claims, 9 Drawing Sheets

(56) References Cited

U.S. PATENT DOCUMENTS

| | | | | |
|---|---|---|---|---|
| 2017/0132794 | A1* | 5/2017 | Lee | H04N 7/188 |
| 2018/0225517 | A1* | 8/2018 | Holzer | G06T 7/73 |
| 2019/0333242 | A1* | 10/2019 | Chen | G06V 20/653 |
| 2020/0363815 | A1* | 11/2020 | Mousavian | G06N 3/088 |
| 2021/0035325 | A1* | 2/2021 | Yang | G06T 7/73 |
| 2021/0082128 | A1* | 3/2021 | Okada | G06T 7/248 |
| 2021/0103299 | A1* | 4/2021 | Zhou | G06T 7/269 |
| 2021/0366146 | A1* | 11/2021 | Khamis | G06T 11/00 |
| 2022/0383457 | A1* | 12/2022 | Zeng | G06T 15/20 |
| 2024/0281995 | A1* | 8/2024 | Zhu | G06T 7/246 |

FOREIGN PATENT DOCUMENTS

| | | | |
|---|---|---|---|
| CN | 108256504 | A | 7/2018 |
| CN | 108345869 | A | 7/2018 |
| CN | 109323709 | A | 2/2019 |
| CN | 110033007 | A | 7/2019 |
| CN | 110120098 | A | 8/2019 |
| CN | 111080699 | A | 4/2020 |
| CN | 112560796 | A | 3/2021 |
| JP | 2010038753 | A | 2/2010 |
| WO | 2021026705 | A1 | 2/2021 |

OTHER PUBLICATIONS

Piga, N. A., Onyshchuk, Y., Pasquale, G., Pattacini, U., & Natale, L. (Oct. 2021). ROFT: Real-Time Optical Flow-Aided 6D Object Pose and Velocity Tracking. arXiv preprint arXiv:2111.03821. (Year: 2021).*

Chiella, A. C., Teixeira, B. O., & Pereira, G. A. (2019). Quaternion-based robust attitude estimation using an adaptive unscented Kalman filter. Sensors, 19(10), 2372. (Year: 2019).*

Wen, B., Mitash, C., Ren, B., & Bekris, K. E. (Oct. 2020). se (3)-tracknet: Data-driven 6d pose tracking by calibrating image residuals in synthetic domains. In 2020 IEEE/RSJ International Conference on Intelligent Robots and Systems (IROS) (pp. 10367-10373). IEEE. (Year: 2020).*

Liu, X., Yu, S. Y., Flierman, N. A., Loyola, S., Kamermans, M., Hoogland, T. M., & De Zeeuw, C. I. (May 2021). OptiFlex: multi-frame animal pose estimation combining deep learning with optical flow. Frontiers in cellular neuroscience, 15, 621252. (Year: 2021).*

Chang, S., Yuan, L., Nie, X., Huang, Z., Zhou, Y., Chen, Y., . . . & Yan, S. (Oct. 2020). Towards accurate human pose estimation in videos of crowded scenes. In Proceedings of the 28th ACM international conference on multimedia (pp. 4630-4634). (Year: 2020).*

Romero, J., Loper, M., & Black, M. J. (Oct. 2015). FlowCap: 2D human pose from optical flow. In German conference on pattern recognition (pp. 412-423). Cham: Springer International Publishing. (Year: 2015).*

Liu, Shuo, "Object Trajectory Estimation Using Optical Flow" (2009). All Graduate Theses and Dissertations. 462. https://digitalcommons.usu.edu/etd/462 retrieved online Nov. 13, 2025 (Year: 2009).*

Chen, Y., Feng, Z., Paes, D., Nilsson, D., & Lovreglio, R. (2025). Real-time human pose estimation and tracking on monocular videos: A systematic literature review. Neurocomputing, 131309. (Year: 2025).*

Office Action for Chinese Patent Application No. 202110867074.5, mailed on Jun. 13, 2025, 13 pages.

Xu, Xun et al., "Lightweight Person-person Interaction Recognition Based on Skeleton Sequence", China Academic Journal Electronic Publishing House, Jun. 2019, 83 pages (English Abstract Submitted).

International Search Report and Written Opinion, International Patent Application No. PCT/CN2022/106374, Sep. 28, 2022, Sep. 28, 2022, with English translation of Search Report (8 pages).

Notice of Allowance for Chinese Patent Application No. 202110867074.5, mailed on Dec. 1, 2025, 7 pages.

Yang et al., "Overfitting Reduction of Pose Estimation for Deep Learning Visual Odometry", Emerging Technologies & Applications, China Communications, Jun. 15, 2020, 15 pages.

* cited by examiner

METHOD, APPARATUS, DEVICE AND MEDIUM FOR POSE ESTIMATION

CROSS REFERENCE TO RELATED APPLICATIONS

The present application claims priority to Chinese Patent Application No. 202110867074.5 filed on Jul. 29, 2021, entitled "METHOD, APPARATUS, DEVICE AND MEDIUM FOR POSE ESTIMATION", which is hereby incorporated by reference in its entirety.

FIELD

The present disclosure relates to the field of data processing, and in particular, to a method, apparatus, device and medium for pose estimation.

BACKGROUND

With the development of computer technology, application scenarios of pose estimation technology become increasingly wide, such as virtual fitting, driving some virtual material fitting and other applications based on pose estimation.

However, current methods for pose estimation will cause some jitter, leading to a certain floating sensation in the effect of pose estimation-based applications.

SUMMARY

In order to solve the above technical problems or at least partially solve the above technical problems, the present disclosure provides a method, device, apparatus and medium for pose estimation.

In a first aspect, the present disclosure provides a method for pose estimation, comprising:

determining, based on original feature points of a target object in a previous frame image to a current frame image, target feature points of the target object in the current frame image, for which the original feature points are successfully tracked;

determining effective feature points that meet a predetermined filtering condition from the target feature points, and generating a movement estimation model based on the effective feature points;

generating a first pose of the target object in the current frame image based on the movement estimation model and pose estimation of the target object in the previous frame image, and extracting a second pose of the target object in the current frame image with a predetermined deep learning model; and smoothing the first pose and the second pose to generate a third pose of the target object in the current frame image.

In an alternative embodiment, the determining target feature points of the target object in the current frame image, for which the original feature points are successfully tracked comprises:

tracking the original feature points with a sparse optical flow method, to obtain successfully tracked target feature points.

In an alternative embodiment, the determining effective feature points that meet a predetermined filtering condition from the target feature points, and generating a movement estimation model based on the effective feature points comprises:

analyzing changes of the target feature points from the previous frame image to the current frame image;

clustering, based on the changes, the target feature points into different feature point sets with different movement directions;

comparing the respective numbers of feature point sets to obtain a target set with a largest number, and determining feature points in the target set as the effective feature points that meet the preset filtering condition; and generating a movement change matrix based on the effective feature points.

In an alternative embodiment, the generating a first pose of the target object in the current frame image based on the movement estimation model and pose estimation of the target object in the previous frame image comprises:

performing dot multiplication processing to the movement change matrix and the pose estimation of the target object in the previous frame image to generate the first pose of the target object in the current frame image.

In an alternative embodiment, the smoothing the first pose and the second pose to generate a third pose of the target object in the current frame image comprises:

determining a first smoothing parameter corresponding to the first pose, and determining a second smoothing parameter corresponding to the second pose; and smoothing the first pose and the second pose based on the first smoothing parameter and the second smoothing parameter to generate the third pose of the target object in the current frame image.

In an alternative embodiment, the determining a first smoothing parameter corresponding to the first pose, and determining a second smoothing parameter corresponding to the second pose comprises:

deciding whether the target feature points meet a predetermined first effective condition;

when the target feature points meet the first effective condition, deciding whether the effective feature points meet a second effective condition; and when the effective feature points meet the second effective condition, determining the first smoothing parameter as a first coefficient and determining the second smoothing parameter as a second coefficient, wherein the first coefficient is greater than the second coefficient, and a difference value of the first coefficient minus the second coefficient is greater than a predetermined threshold.

In an alternative embodiment, further comprising:

when the target feature points do not meet the first effective condition, determining the first smoothing parameter as a third coefficient and determining the second smoothing parameter as a fourth coefficient, wherein the third coefficient is less than the fourth coefficient, and a difference value of the fourth coefficient minus the third coefficient is greater than the predetermined threshold.

In an alternative embodiment, further comprising:

when the target feature points meet the first effective condition and the effective feature points do not meet the second effective condition, determining the first smoothing parameter as a fifth coefficient and determining the second smoothing parameter as a sixth coefficient, wherein an absolute value of a difference between the fifth coefficient and the sixth coefficient is less than the predetermined threshold.

In an alternative embodiment, the deciding whether the target feature points meet a predetermined first effective condition comprises:

comparing the number of the target feature points with a predetermined first threshold;

if the number of the target feature points is greater than or equal to the first threshold, determining that the first effective condition is met; and if the number of the target feature points is less than the first threshold, determining that the first effective condition is not met.

In an alternative embodiment, the deciding whether the target feature points meet a predetermined first effective condition comprises:

calculating a first ratio of the number of the target feature points to the number of the original feature points, and comparing the first ratio with a predetermined second threshold;

if the first ratio is greater than or equal to the second threshold, determining that the first effective condition is met; and if the first ratio is less than the second threshold, determining that the first effective condition is not met.

In an alternative embodiment, the deciding whether the effective feature points meet a second effective condition comprises:

comparing the number of the effective feature points with a predetermined third threshold;

if the number of the effective feature points is greater than or equal to the third threshold, determining that the second effective condition is met; and if the number of the effective feature points is less than the third threshold, determining that the second effective condition is not met.

In an alternative embodiment, the deciding whether the effective feature points meet a second effective condition comprises:

calculating a second ratio of the number of the effective feature points to the number of the target feature points, and comparing the second ratio with a predetermined fourth threshold;

if the second ratio is greater than or equal to the fourth threshold, determining that the second effective condition is met; and;

if the second ratio is less than the fourth threshold, determining that the second effective condition is not met.

In a second aspect, the present disclosure further provides an apparatus for pose estimation, wherein the apparatus comprises:

a determining module, configured to determine, based on original feature points of a target object in a previous frame image to a current frame image, target feature points of the target object in the current frame image, for which the original feature points are successfully tracked;

a filtering module, configured to determine effective feature points that meet a predetermined filtering condition from the target feature points, and generate a movement estimation model based on the effective feature points;

a first generating module, configured to generate a first pose of the target object in the current frame image based on the movement estimation model and pose estimation of the target object in the previous frame image, and extract a second pose of the target object in the current frame image with a predetermined deep learning model; and;

a second generating module, configured to smooth the first pose and the second pose to generate a third pose of the target object in the current frame image.

In a third aspect, the present disclosure provides a computer-readable storage medium, wherein the computer readable storage medium stores instructions which, when ran on a terminal device, cause the terminal device to implement the above method.

In a fourth aspect, the disclosure provides an electronic device, wherein the electronic device comprises: a processor; a memory, configured to store processor executable instructions; and the processor is configured to read the executable instructions from the memory and execute the instructions to implement the method.

In a fifth aspect, the present disclosure provides a computer program product, wherein the computer program product comprises a computer program/instruction which, when executed by a processor, implements the above method.

Compared with the prior art, the technical solution provided by embodiments of the present disclosure has at least the following advantages:

In the method for pose estimation provided by the embodiments of the present disclosure, a first pose is generated based on a movement estimation model, and the first pose has good stability. A second pose is generated based on a deep learning model, and the accuracy of the second pose is higher. A third pose is generated based on the first and second pose so that pose estimation can have good stability and accuracy at the same time, thereby improving the user's experience and satisfaction.

BRIEF DESCRIPTION OF THE DRAWINGS

The above and other features, advantages and aspects of the various embodiments of the present disclosure will become more apparent with reference to the following specific implementation in conjunction with the accompanying drawings, wherein the same or similar reference numerals represent the same or similar elements throughout the drawings. It should be understood that the drawings are schematic and the components and elements are not necessarily drawn to scale.

DETAILED DESCRIPTION

Figure 1:
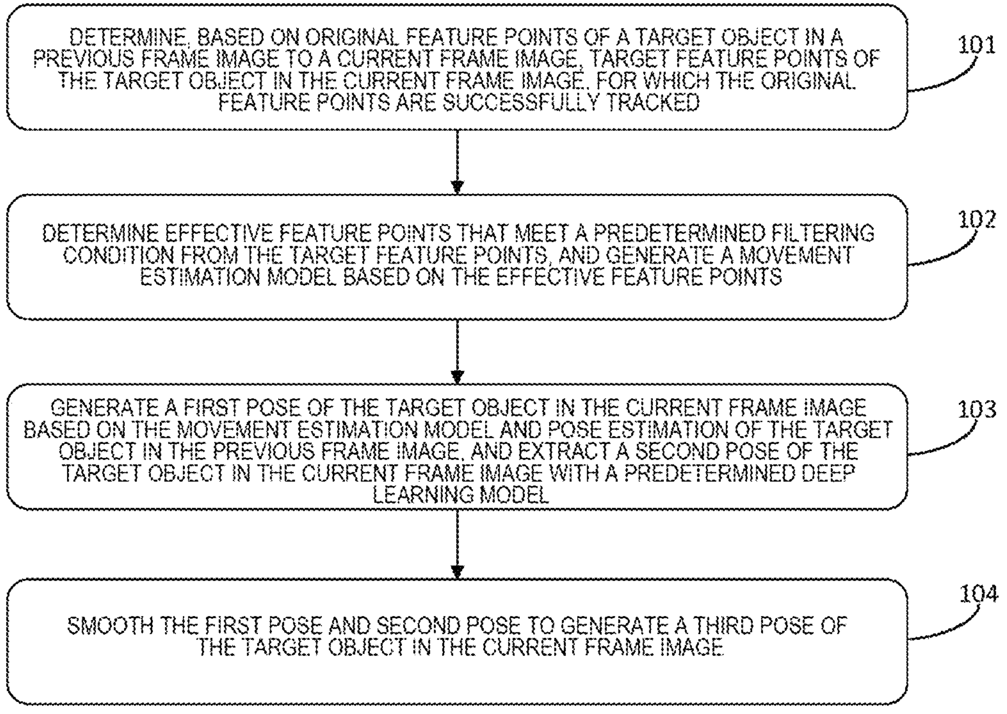
FIG. 1 is a schematic flowchart of a method for pose estimation provided by an embodiment of the present disclosure.

Embodiments of the present disclosure will be described in more detail below with reference to the drawings. Although some embodiments of the present disclosure are shown in the drawings, it should be understood that the present disclosure may be embodied in various forms and should not be construed as limited to the embodiments set forth herein. Instead, these examples are provided so that the understanding of the present disclosure can be thorough and complete. It should be understood that the drawings and embodiments of the present disclosure are for illustrative purposes only, and are not intended to limit the protection scope of the present disclosure.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

The term "comprising" and its variations herein are non-exclusive, i.e., "including but not limited to". The term "based on" means "based at least in part on". The term "one embodiment" means "at least one embodiment." The term "another embodiment" means "at least one further embodiment". The term "some embodiments" means "at least some embodiments." Relevant definitions of other terms will be given in the description below.

It should be noted that concepts such as "first" and "second" mentioned herein are only for distinguishing different devices, modules or units, rather than limiting the sequence or interdependence of functions performed by these devices, modules or units.

It should be noted that the determiners of "a" and "a plurality" mentioned in the present disclosure are illustrative rather than restrictive. Those skilled in the art should understand that, unless the context clearly indicates otherwise, such determiners should be understood as "one or more".

The names of messages or information exchanged between multiple devices in the implementation of the present disclosure are used for illustrative purposes only, rather than limiting the scope of such messages or information.

To solve the above problems, an embodiment of the present disclosure provides a method for pose estimation, which is described below in conjunction with specific embodiments.

FIG. 1 is a schematic flowchart of a method for pose estimation provided by an embodiment of the present disclosure. The method may be performed by an apparatus for pose estimation, which may be implemented in software and/or hardware and generally integrated in an electronic device. As shown in FIG. 1, the method comprises:

Step 101: determine, based on original feature points of a target object in a previous frame image to a current frame image, target feature points of the target object in the current frame image, for which the original feature points are successfully tracked.

After capturing a video of the target object and estimating the pose of the target object in the video frame, related applications are available according to the estimated pose. For example, when the target object is a human foot, a virtual shoe fitting is performed according to the estimated pose of the foot; when the target object is a human hand, applications such as special effects may be added. Therefore, in order to reduce the jitter of the pose estimation and improve the fitting effect of the application, it is necessary to estimate the pose of the target object more accurately. It is noteworthy that the target object may be selected according to the application scenario, which is not limited in this embodiment.

For the current frame image to be subjected to the pose estimation in the video stream, the method for pose estimation provided in the present application may estimate the pose of the target object in the current frame image by processing the current frame image and the neighboring previous frame image which is captured. The specific process is described as follows:

In some embodiments of the present disclosure, an original feature point may be extracted from the target object in the previous frame image. Various methods may be used for extracting the original feature point and may be selected according to different application scenarios, which is not limited in this embodiment, such as the harris corner point method, the shi-tomasi corner point method, the FAST (Features From Accelerated Segment Test) feature point method, etc. It may be understood that the extracted original feature point may be different depending on the target object. For example, if the target object is a human hand, the extracted original feature points may include the knuckle points of each finger and the wrist joint.

Then, the original feature point of the target object in the previous frame of the current frame image is tracked, and a target feature point of the target object in the current frame image which corresponds to the original feature point is determined by tracking. Various methods may be used for tracking the original feature point and may be selected according to the application scenario, which is not limited in this embodiment, such as a sparse optical flow method, a dense optical flow method, etc.

It may be understood that during tracking the original feature points, all the original feature points might be successfully tracked, or all the original feature points might fail to be tracked, or some of the original feature points fail to be tracked while some are successfully tracked. Therefore, the target feature point may include a feature point in the current frame image which corresponds to the successfully tracked original feature point.

For example, the number of original feature points of the target object in the previous frame of the current frame image is 100. If all the original feature points are successfully tracked, the number of corresponding target feature points of the target object in the current frame image is 100. If part of the original feature points are successfully tracked, then the number of corresponding target feature points of the target object in the current frame image is the number of the part of the original feature points. For example, if 80 original feature points are successfully tracked, then the number of target feature points is 80.

In some embodiments of the present disclosure, it is noteworthy that the movement amplitude of the target object is large, so that the target object in the current frame image changes greatly relative to the target object in the previous frame image, and the probability of the current frame image successfully tracking the original feature points in the previous frame image is reduced. As a result, the target feature points are insufficient. In this case, the feature points of the target object in the current frame image may be re-extracted and used as original feature points. The original feature points may be used to generate the target feature points of the target object in the next frame image of the current frame.

Step 102: determine effective feature points that meet a predetermined filtering condition from the target feature points, and generate a movement estimation model based on the effective feature points.

It is noteworthy that in some embodiments of the present disclosure, there are some target feature points with large tracking errors. In order to accurately generate the movement estimation model, these target feature points with large tracking errors are removed, target feature points with better tracking effect are retained.

In an alternative implementation, a filtering condition may be predetermined to filter the target feature points to obtain more accurate target feature points, which are effective feature points. It may be understood that in some application scenarios, if all target feature points meet the preset filtering condition, the effective feature points may be all the target feature points in the current frame image.

For example, the number of target feature points of the target object in the current frame image is 100. If all target feature points meet the preset filtering condition, the number of effective feature points of the target object in the current frame image may be 100. If 80 of the 100 target feature points meet the preset filtering condition, then the number of effective feature points of the target object in the current frame image may be 80.

Alternatively, there are a variety of filtering conditions for filtering out effective feature points, which may be selected according to the application scenario. This embodiment does not intend to limit. An example illustration is as follows:

Example 1

A distance threshold may be predetermined, and a distance between each original feature point and its corresponding target feature point is calculated. The distance may be filtered through the distance threshold. If the distance is less than the preset distance threshold, the target feature point corresponding to the distance may be considered as an effective feature point.

Example 2

The change direction of each target feature point from the previous frame image to the current frame image is calculated, and effective feature points are determined according to the change direction.

In some embodiments of the present disclosure, a corresponding movement estimation model may be generated according to the obtained effective feature points. There are various types of movement estimation models, which may be selected according to the specific application scenario and are not limited in this embodiment, such as a movement change matrix, a function, etc.

Step 103: generate a first pose of the target object in the current frame image based on the movement estimation model and pose estimation of the target object in the previous frame image, and extract a second pose of the target object in the current frame image with a predetermined deep learning model.

In an alternative implementation, after obtaining the movement estimation model, the pose estimation of the target object in the previous frame image may be processed with the movement estimation model, to generate the first pose of the target object in the current frame image. It may be understood that the pose estimation of the target object in the previous frame image may be processed with the movement estimation model according to the movement law of effective feature points, so that the first pose of the target object in the current frame image is generated.

Further, the second pose of the target object in the current frame image is generated with the preset deep learning model. There are a variety of predetermined deep learning models, which may be selected according to different application scenarios and are not limited in this embodiment.

Step 104: smooth the first pose and second pose to generate a third pose of the target object in the current frame image.

In some embodiments of the present disclosure, on the basis of generating the first and second poses, the first and second pose may be smoothed to generate the third pose of the target object in the current frame image. There are various kinds of smoothing processing, which may be selected according to the application scenario and are not limited in this embodiment. An example illustration is as follows:

In Example 1, a predetermined neural network model may be trained with training samples, and the trained neural network model may smooth the first and second poses. When the model is applied, the first and second poses are input, and the model's output is the third pose of the current frame image generated by smoothing processing.

In Example 2, smoothing parameters may be predetermined according to the application scenario, and the first and second poses may be smoothed according to the smoothing parameters.

According to the pose estimation method of this embodiment, the first pose of the target object is generated based on the movement estimation model. The first pose has a high correlation with the target object in the previous frame image, so the first pose has a good stability. Good stability can avoid the jitter of the pose estimation, so that the application effect generated based on the pose estimation has good stability. The second pose of the target object is generated according to the deep learning model, and the second pose has a high accuracy. The third pose is generated according to the first pose and the second pose. With the advantages of the first pose and the second pose, the third pose has good stability and accuracy at the same time, so that the addition position of the application effect generated based on the pose estimation is more appropriate, and the user experience and satisfaction are improved.

Figure 2:
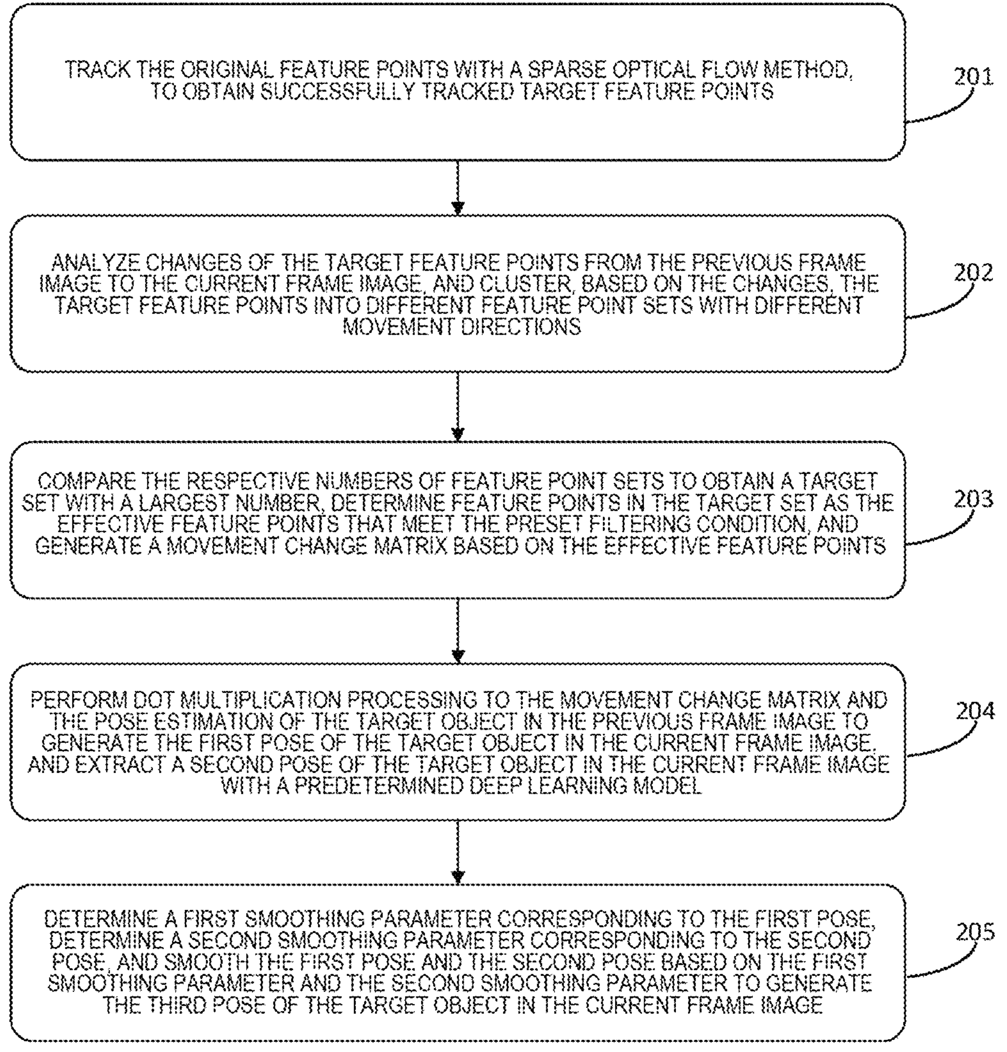
FIG. 2 is a schematic flowchart of another method for pose estimation provided by an embodiment of the present disclosure.

FIG. 2 is a schematic flowchart of another method for pose estimation provided by an embodiment of the present disclosure. Based on the above embodiment, this embodiment more clearly introduces the specific tracking method and smoothing method as follows:

Step 201: track the original feature points with a sparse optical flow method, to obtain successfully tracked target feature points.

It is noteworthy that the optical flow may be used to represent changes in the image. If the target object in the image moves, the optical flow may contain movement information of the target object. Therefore, the optical flow may be used to represent a corresponding relationship of the target object between the current frame image and the previous frame image. The sparse optical flow method may be used for optical flow calculation. There are various sparse optical flow methods to be chosen, such as the pyramid Lucas-Kanade optical flow method.

Therefore, the original feature points of the target object which are extracted in the previous frame image may be tracked using the sparse optical flow method, and the target feature points of the target object which are successfully tracked in the current frame image are obtained. Through the sparse optical flow method, the original feature points may be tracked quickly, and when applied to a mobile terminal, a low delay of the generated pose estimation can be guaranteed.

Step 202: analyze changes of the target feature points from the previous frame image to the current frame image, and cluster, based on the changes, the target feature points into different feature point sets with different movement directions.

In some embodiments of the present disclosure, the changes of the target feature points from the previous frame image to the current frame image may be analyzed. The movement direction of the target feature points included in the changes includes but is not limited to any of: upward, lower left and clockwise. The target feature points may be clustered into different feature point sets with different movement directions based on the changes. It is noteworthy that a single target feature point may exist in multiple feature point sets. For example, the movement direction of a target feature point may satisfy both left and counterclockwise, and the target feature point may exist in a feature point set with the left movement direction and in a feature point set with the counterclockwise movement direction.

Step 203: compare the respective numbers of feature point sets to obtain a target set with a largest number, determine feature points in the target set as the effective feature points that meet the preset filtering condition, and generate a movement change matrix based on the effective feature points.

Then, the numbers of target feature points in different feature point sets corresponding to different movement directions are compared to obtain the target set with the largest number of target feature points, and the feature points in the target set are determined as the effective feature points meeting the preset filtering condition. For example, assuming a total of 80 target feature points changing from the previous frame image to the current frame image, the target feature points are clustered into a first feature point set with the bottom-to-top movement direction, a second feature point set with the top-to-bottom movement direction, and a third feature point set with the left-to-right movement direction, wherein, the number of feature points in the first feature point set is 75, the number of feature points in the second feature point set is 2, and the number of feature points in the third feature point set is 3, so the first feature point set is determined as the target set, in which 75 feature points are effective feature points. After obtaining the effective feature points, the movement change matrix may be generated according to the effective feature points.

Step 204: perform dot multiplication processing to the movement change matrix and the pose estimation of the target object in the previous frame image to generate the first pose of the target object in the current frame image, and extract a second pose of the target object in the current frame image with a predetermined deep learning model.

In some embodiments of the present application, after obtaining the movement change matrix, the pose estimation of the target object in the previous frame image may be processed based on the movement matrix with a dot multiplication method, so as to generate the first pose of the target object in the current frame image. In addition, the second pose of the target object in the current frame image may be further extracted through the preset deep learning model.

Step 205: determine a first smoothing parameter corresponding to the first pose, determine a second smoothing parameter corresponding to the second pose, and smooth the first pose and the second pose based on the first smoothing parameter and the second smoothing parameter to generate the third pose of the target object in the current frame image.

It may be understood that the first smoothing parameter may be used to determine a weight of the first pose in generating the third pose. The second smoothing parameter may be used to determine a weight of the second pose in generating the third pose.

In some embodiments of the present disclosure, the first smoothing parameter can be determined depending on whether the target feature point satisfies a first effective condition, and the second smoothing parameter may be determined depending on whether the effective feature point satisfies a second effective condition. The first and second poses may be smoothed based on the obtained first and second smoothing parameters. For example, the first smoothing parameter may be used as the weight of the first pose, the second smoothing parameter used as the weight of the second pose, and the third pose may be generated based on the first pose and its weight, and the second pose and its weight.

It is noteworthy that when the target feature points meet the first effective condition, it means that the number of target feature points is sufficient. When the effective feature points meet the second effective condition, it means that the number of effective feature points is sufficient. It may be understood that there are a variety of methods of deciding whether the target feature points meet the preset first condition, and also many methods of deciding whether the effective feature points meet the preset second condition.

For example, the methods of deciding whether the target feature points meet the preset first condition include, without limitation to:

In a first method, the number of target feature points is compared with a predetermined first threshold. If the number of target feature points is greater than or equal to the first threshold, it is determined that the first effective condition is met. If the number of target feature points is less than the first threshold, then it is determined that the first effective condition is not met. The first threshold may be set based on the different application scenarios, which is not limited in this embodiment. For example, the first threshold may be preset to 300. When the number of target feature points is 500, the number of target feature points is greater than the first threshold, and it is determined that the first effective condition is met.

In a second method, a first ratio of the number of target feature points to the number of original feature points is calculated, and the first ratio is compared with a predetermined second threshold. If the first ratio is greater than or equal to the second threshold, then it is determined that the first effective condition is met. If the first ratio is less than the second threshold, then it is determined that the first effective condition is not met.

The target feature points are filtered out from the original feature points. It may be understood that the smaller the proportion of the removed feature points in the original feature points, the higher the confidence level of the target feature points. The second threshold may be set based on the different application scenarios, which is not limited in this embodiment. For example, the second threshold may be predetermined to 0.7. Where the number of original feature points is 625 and the number of target feature points is 500, the first ratio is 0.8 which is greater than the second threshold, so it is determined that the first effective condition is met.

For example, the methods of deciding whether the effective feature points meet the preset second condition include, without limitation to:

In a first method, the number of effective feature points is compared with a predetermined third threshold. If the number of effective feature points is greater than or equal to the third threshold, it is determined that the second effective condition is met. If the number of effective feature points is less than the third threshold, it is determined that the second effective condition is not met.

The third threshold may be set based on different application scenarios, which is not limited in this embodiment. For example, the third threshold may be predetermined to 300. Where the number of effective feature points is 500, the number of effective feature points is greater than the third threshold, so it is determined that the second effective condition is met.

In a second method, a second ratio of the number of effective feature points to the number of target feature points is calculated, and the second ratio is compared with a predetermined fourth threshold. If the second ratio is greater than or equal to the fourth threshold, then it is determined that the second effective condition is met. If the second ratio is less than the fourth threshold, then it is determined that the second effective condition is not met.

The effective feature points are filtered out from the target feature points. It may be understood that the smaller the proportion of the removed feature points in the target feature points, the higher the confidence level of the effective feature points. The fourth threshold may be set based on the different application scenarios, which is not limited in this embodiment. For example, the fourth threshold may be preset to 0.7. Where the number of effective feature points is 400 and the number of target feature points is 500, the second ratio is 0.8 which is greater than the fourth threshold, so it is determined that the second effective condition is met.

Alternatively, the first smoothing parameter and the second smoothing parameter may be determined depending on whether the first effective condition and/or the second effective condition are/is met in the application scenario. There are a variety of such determining methods, which may be selected based on the application scenario. This embodiment does not intend to limit. An example illustration is as follows:

Example 1

If the target feature points meet the first effective condition and the effective feature points meet the second effective condition, the first smoothing parameter is determined as a first coefficient and the second smoothing parameter is determined as a second coefficient, wherein the first coefficient is greater than the second coefficient, and a difference between the first coefficient and the second coefficient is greater than the predetermined threshold.

It may be understood that, in Example 1, the numbers of target feature points and effective feature points are both sufficient. Therefore, the first pose generated by the movement estimation model and the pose estimation of the previous frame image is precise enough, and the stability of the first pose is also high. Therefore, in this scenario, the first pose occupies a larger proportion during generating the third pose. Therefore, the first coefficient corresponding to the first smoothing parameter is greater than the second coefficient corresponding to the second smoothing parameter. In order to make the difference between the first coefficient and the second coefficient large enough, a threshold may also be predetermined so that the difference of the first coefficient minus the second coefficient is greater than the preset threshold. The predetermined threshold may be set based on the application scenario, which is not limited in this example, such as 0.5, 0.7.

In an alternative implementation, the predetermined threshold could be 0.5, with the target feature point satisfying the first effective condition and the effective feature point satisfying the second effective condition. The first coefficient may be 1, and then the first smoothing parameter is the first coefficient 1. The second coefficient may be 0, and then the second smoothing parameter is the second coefficient 0. The third pose of the current frame image is the same as the first pose of the current frame image.

Example 2

When the target feature points do not meet the first effective condition, it is determined that the first smoothing parameter is the a third coefficient and the second smoothing parameter is a fourth coefficient, wherein the third coefficient is less than the fourth coefficient, and a difference between the fourth coefficient and the third coefficient is greater than the predetermined threshold.

It may be understood that in Example 2, the number of target feature points is not large enough. Therefore, the first pose generated by the movement estimation model and the pose estimation of the previous frame image is not accurate enough. Therefore, in this scenario, the second pose occupies a larger proportion during generating the third pose. Therefore, the third coefficient corresponding to the first smoothing parameter is less than the fourth coefficient corresponding to the second smoothing parameter. In order to make the difference between the third coefficient and the fourth coefficient large enough, a threshold may also be predetermined so that the difference of the fourth coefficient minus the third coefficient is greater than the preset threshold. The preset threshold may be set based on the application scenario, which is not limited in this example, such as 0.5, 0.7.

In an alternative implementation, the predetermined threshold could be 0.5, with the target feature point not satisfying the first effective condition. The third coefficient may be 0, and then the first smoothing parameter is the third coefficient 0. The fourth coefficient may be 1, and then the second smoothing parameter is the fourth coefficient 1. The third pose of the current frame image is the same as the second pose of the current frame image.

Example 3

When the target feature points meet the first effective condition, and the effective feature points do not meet the second effective condition, it is determined that the first smoothing parameter is a fifth coefficient, and the second smoothing parameter is a sixth coefficient, wherein the absolute value of a difference between the fifth coefficient and the sixth coefficient is less than the predetermined threshold.

It may be understood that in Example 3, the number of target feature points is large enough and the number of effective feature points is not large enough. Therefore, the first pose generated by the movement estimation model and the pose estimation of the previous frame image is not precise enough, and the first pose may be smoothed with the second pose, so as to generate a third pose. Therefore, in this scenario, there is not much difference between the proportions of the first pose and the second pose during generating the third pose. Therefore, a value difference between the fifth coefficient corresponding to the first smoothing parameter and the sixth coefficient corresponding to the second smoothing parameter is not large. In order to make the difference between the fifth coefficient and the sixth coefficient small enough, a threshold may further be predetermined, so that the absolute value of the difference between the fifth coefficient and the sixth coefficient is less than the predetermined threshold. The value of the predetermined threshold may be set based on the application scenario, which is not limited in this example, such as 0.05 or 0.01.

According to the method for pose estimation provided by the embodiments of the present disclosure, original feature points may be quickly tracked with the sparse optical flow method. When the application scenario is the mobile terminal, the real-time feature of the pose estimation method operating on the mobile terminal device may be guaranteed. The effective feature points are obtained according to the movement direction of the target feature points, thus removing inaccurate target feature points and further improving the performance of the first pose. The first and second poses are smoothed based on the first smoothing coefficient and the second smoothing coefficient to generate the third pose. The first and second poses are processed efficiently and concisely with the smoothing coefficients, thereby increasing the generating efficiency of the third pose, improving the user experience and enhancing the user satisfaction.

Figure 3A:
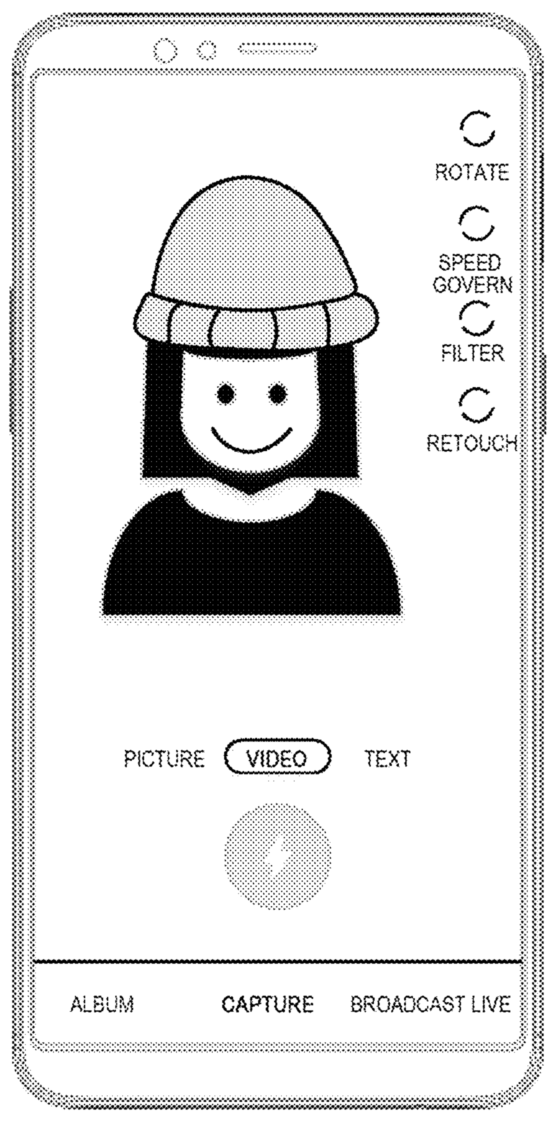
FIG. 3*a* is a schematic diagram of a previous frame image in a method for pose estimation provided by an embodiment of the present disclosure.
Figure 3B:
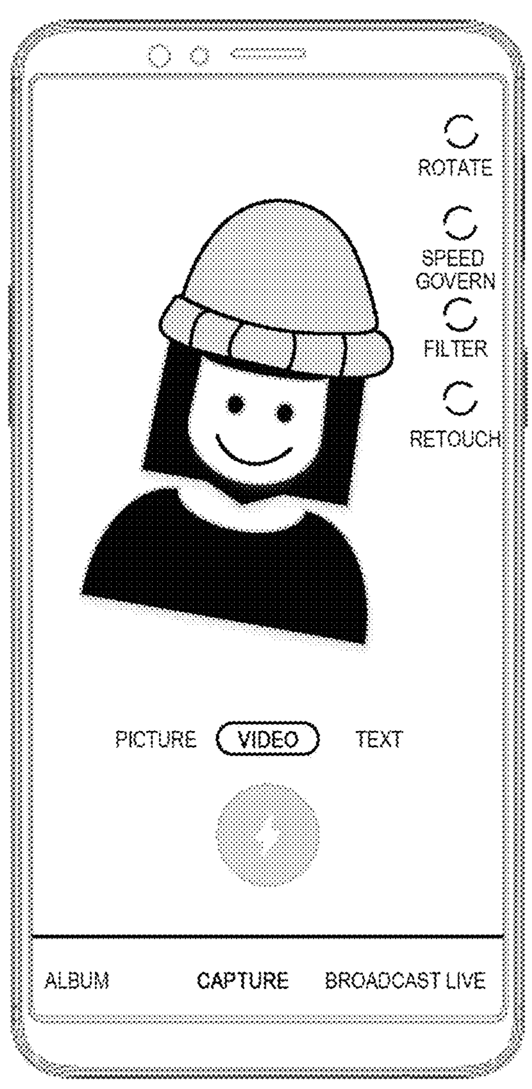
FIG. 3*b* is a schematic diagram of a current frame image in a method for pose estimation provided by an embodiment of the present disclosure.
Figure 3C:
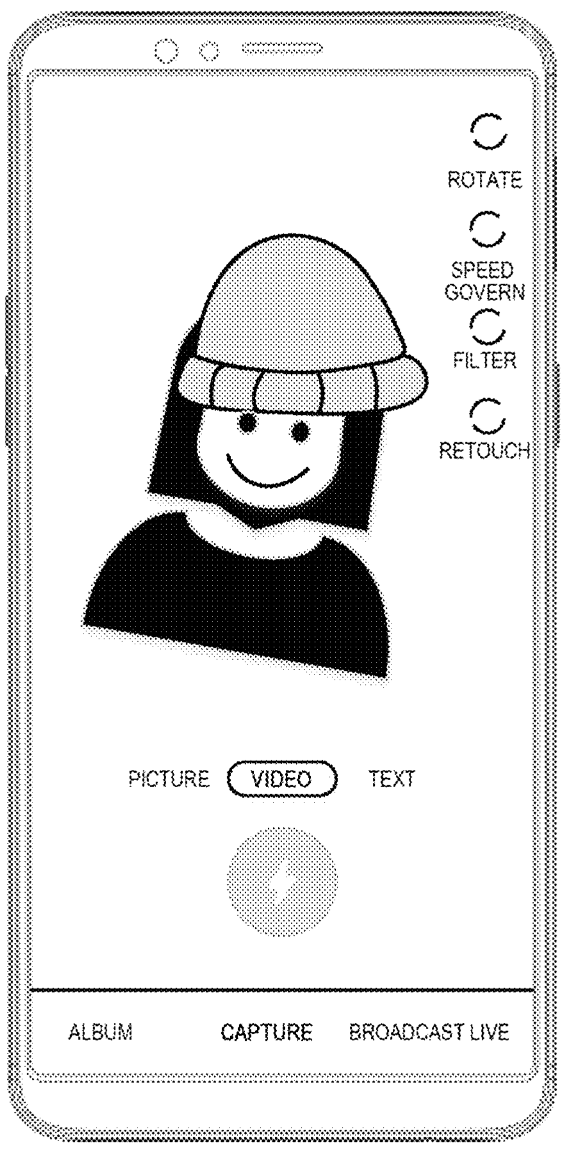
FIG. 3*c* is a schematic diagram of a current frame image in another method for pose estimation provided by an embodiment of the present disclosure.
Figure 4A:
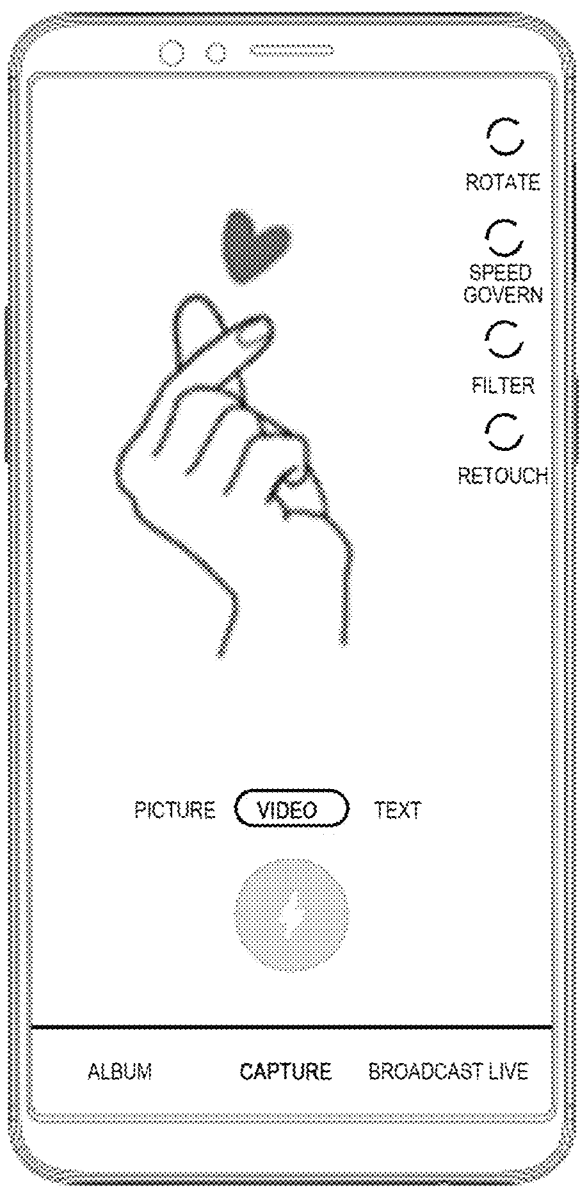
FIG. 4*a* is a schematic diagram of a previous frame image to a current frame image in another method for pose estimation provided by an embodiment of the present disclosure.
Figure 4B:
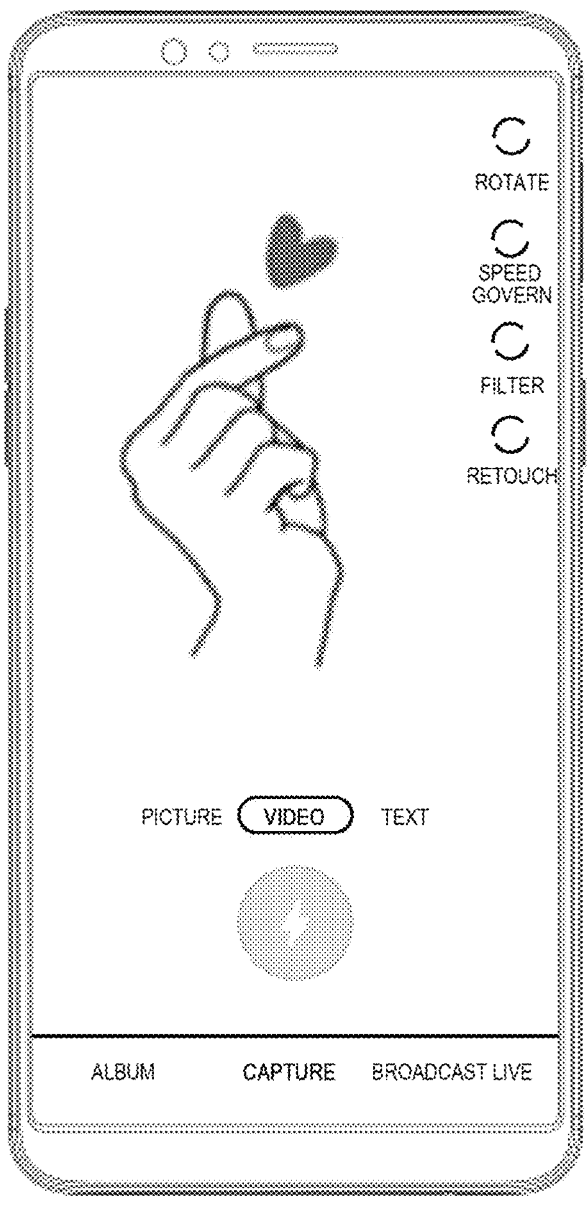
FIG. 4*b* is a schematic diagram of a current frame image in another method for pose estimation provided by an embodiment of the present disclosure.
Figure 4C:
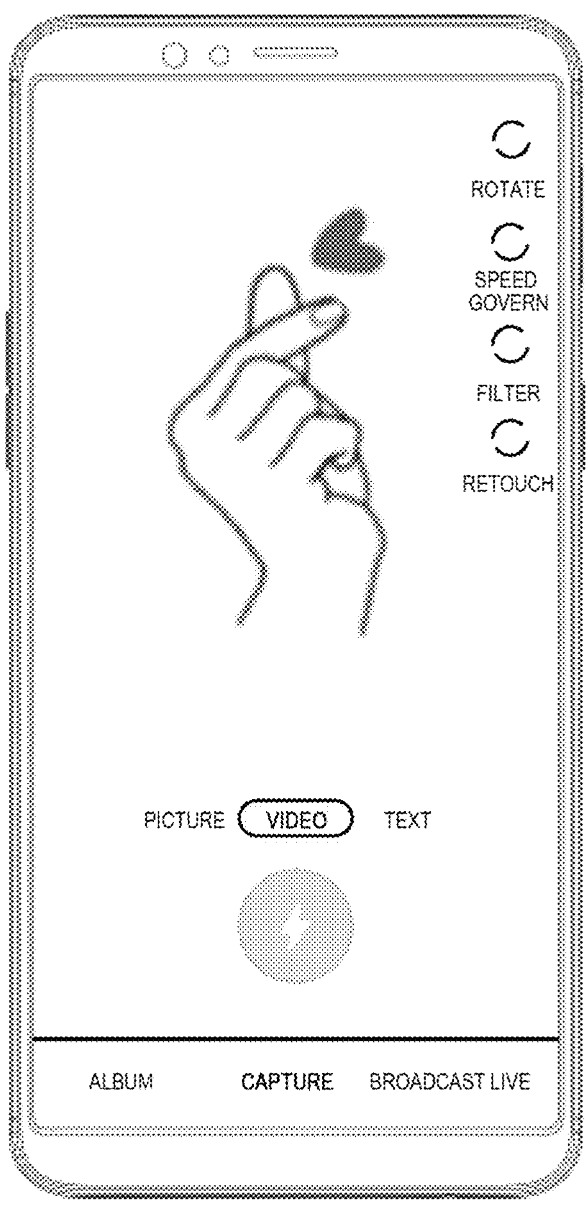
FIG. 4*c* is a schematic diagram of a current frame image in another method for pose estimation provided by an embodiment of the present disclosure.

Based on the above embodiments, in order to more clearly illustrate the application effect of the method for pose estimation provided in the present disclosure, the virtual fitting shown in FIGS. 3*a*, 3*b* and 3*c* and the virtual material adding shown in FIGS. 4*a*, 4*b* and 4*c* are taken as specific application, which is illustrated as follows:

FIG. 3*a* is a schematic diagram of a previous frame image in a method for pose estimation provided by the embodiments of the present disclosure, wherein the target object is a human head, and the application effect is to wear a virtual hat on the human head. As shown in FIG. 3*a*, the position of the hat is appropriate at this time.

In some embodiments of the present application, the target feature points of the head in the current frame image may be determined based on the original feature points of the head in the previous frame image, and the target feature points may be filtered out to obtain effective feature points. The movement estimation model is generated based on the effective feature points. The first pose is generated based on the movement estimation model and the pose estimation in the previous frame image. The second pose is generated with a deep learning model. The third pose is generated based on the first and second poses.

FIG. 3*b* is a schematic diagram of a current frame image in a method for pose estimation provided by the embodiments of the present disclosure. The application effect added based on the third pose is as shown in FIG. 3*b*, wherein the head moves clockwise and the hat is adjusted accordingly, at which point the position of the hat is appropriate.

If the effect of the third pose is unsatisfactory, the application effect is as shown in FIG. 3*c*, in which the position of the hat is inappropriate.

FIG. 4*a* is a schematic diagram of a previous frame image of a current frame image in another method for pose estimation provided by the embodiments of the present disclosure, wherein the target object is a human hand, and the application effect is to add a virtual heart to the human hand. As shown in FIG. 4*a*, the position of the heart is appropriate at this time.

In some embodiments of the present application, the target feature points of the hand in the current frame image may be determined based on the original feature points of the hand in the previous frame image, and the target feature points may be filtered out to obtain effective feature points. The movement estimation model is generated based on the effective feature points. The first pose is generated based on the movement estimation model and the pose estimation in the previous frame image. The second pose is generated with a deep learning model. The third pose is generated according to the first and second poses.

FIG. 4*b* is a schematic diagram of a current frame image in another method for pose estimation provided by the embodiments of the present disclosure. The application effect added based on the third pose is as shown in FIG. 4*b*, wherein the hand moves clockwise and the heart is adjusted accordingly, at which point the position of the heart is appropriate.

If the effect of the third pose is unsatisfactory, the application effect is as shown in FIG. 4*c*, in which the position of the heart is inappropriate.

According to the pose estimation method of the embodiments of this application, the application scenario is to add special effects to the target object in the video. This method may increase the stability and preciseness of applied special effects and improve the user experience.

According to the embodiments of the present disclosure, the present disclosure also provides an apparatus for pose estimation.

Figure 5:
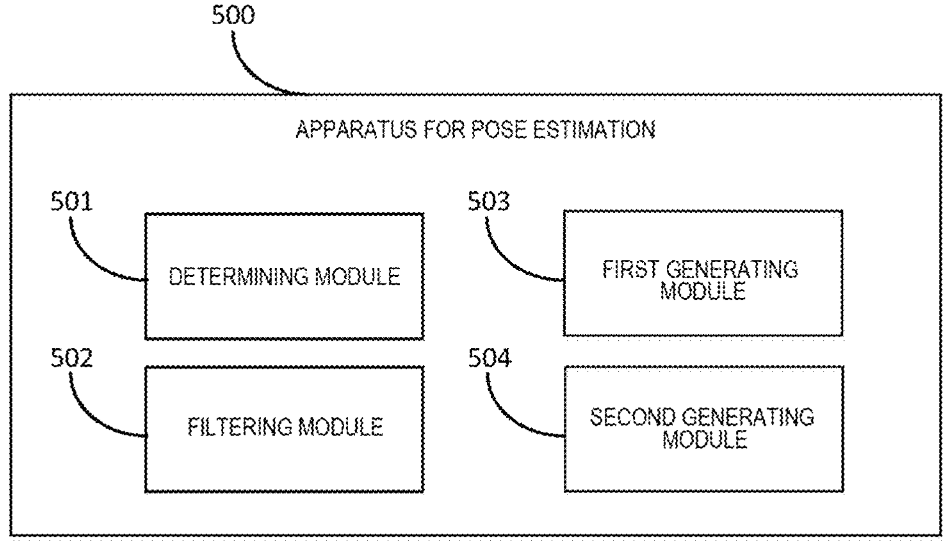
FIG. 5 is a structural schematic diagram of an apparatus for pose estimation provided by an embodiment of the present disclosure.

FIG. 5 is a structural schematic diagram of an apparatus for pose estimation provided by an embodiment of the present disclosure, and the apparatus may be implemented by software and/or hardware, and generally integrated in an electronic device. As shown in FIG. 5, the apparatus for pose estimation 500 may include:

a determining module 501, configured to determine, based on original feature points of a target object in a previous frame image to a current frame image, target feature points of the target object in the current frame image, for which the original feature points are successfully tracked;

a filtering module 502, configured to determine effective feature points that meet a predetermined filtering condition from the target feature points, and generate a movement estimation model based on the effective feature points;

a first generating module 503, configured to generate a first pose of the target object in the current frame image based on the movement estimation model and pose estimation of the target object in the previous frame image, and extract a second pose of the target object in the current frame image with a predetermined deep learning model; and a second generating module 504, configured to smooth the first pose and the second pose to generate a third pose of the target object in the current frame image.

Alternatively, the determining module 501 is configured to:

track the original feature points with a sparse optical flow method, to obtain successfully tracked target feature points.

Alternatively, the filtering module 502 is configured to:

analyze changes of the target feature points from the previous frame image to the current frame image;

cluster, based on the changes, the target feature points into different feature point sets with different movement directions;

compare the respective numbers of feature point sets to obtain a target set with a largest number, and determine feature points in the target set as the effective feature points that meet the preset filtering condition;

generate a movement change matrix based on the effective feature points.

Alternatively, the first generating module 503 is configured to:

perform dot multiplication processing to the movement change matrix and the pose estimation of the target object in the previous frame image to generate the first pose of the target object in the current frame image.

Alternatively, the second generating module 504 includes:

a determining unit, configured to determine a first smoothing parameter corresponding to the first pose, and determine a second smoothing parameter corresponding to the second pose;

a generating unit, configured to smooth the first pose and the second pose based on the first smoothing parameter and the second smoothing parameter to generate the third pose of the target object in the current frame image.

Alternatively, the determining unit is configured to:

decide whether the target feature points meet a predetermined first effective condition;

when the target feature points meet the first effective condition, decide whether the effective feature points meet a second effective condition; and when the effective feature points meet the second effective condition, determine the first smoothing parameter as a first coefficient and determine the second smoothing parameter as a second coefficient, wherein the first coefficient is greater than the second coefficient, and a difference value of the first coefficient minus the second coefficient is greater than a predetermined threshold.

Alternatively, the determining unit is further configured to:

when the target feature points do not meet the first effective condition, determine the first smoothing parameter as a third coefficient and determine the second smoothing parameter as a fourth coefficient, wherein the third coefficient is less than the fourth coefficient, and a difference value of the fourth coefficient minus the third coefficient is greater than the predetermined threshold.

Alternatively, the determining unit is further configured to:

when the target feature points meet the first effective condition and the effective feature points do not meet the second effective condition, determine the first smoothing parameter as a fifth coefficient and determine the second smoothing parameter as a sixth coefficient, wherein an absolute value of a difference between the fifth coefficient and the sixth coefficient is less than the predetermined threshold.

Alternatively, the determining unit is configured to:

compare the number of the target feature points with a predetermined first threshold;

if the number of the target feature points is greater than or equal to the first threshold, determine that the first effective condition is met; and if the number of the target feature points is less than the first threshold, determine that the first effective condition is not met.

Alternatively, the determining unit is configured to:

calculate a first ratio of the number of the target feature points to the number of the original feature points, and compare the first ratio with a predetermined second threshold;

if the first ratio is greater than or equal to the second threshold, determine that the first effective condition is met; and if the first ratio is less than the second threshold, determine that the first effective condition is not met.

Alternatively, the determining unit is configured to:

compare the number of the effective feature points with a predetermined third threshold;

if the number of the effective feature points is greater than or equal to the third threshold, determine that the second effective condition is met;

if the number of the effective feature points is less than the third threshold, determine that the second effective condition is not met.

Alternatively, the determining unit is configured to:

calculate a second ratio of the number of the effective feature points to the number of the target feature points, and compare the second ratio with a predetermined fourth threshold;

if the second ratio is greater than or equal to the fourth threshold, determine that the second effective condition is met; and if the second ratio is less than the fourth threshold, determine that the second effective condition is not met.

The apparatus for pose estimation provided by embodiments of the present disclosure can execute the method for pose estimation provided by any embodiment of the present disclosure, and has the corresponding functional modules and beneficial effects of executing method.

Embodiments of the present disclosure further provide a computer program product, including a computer program/instruction, which when executed by a processor, implements the method for pose estimation provided by any embodiment of the present disclosure.

Figure 6:
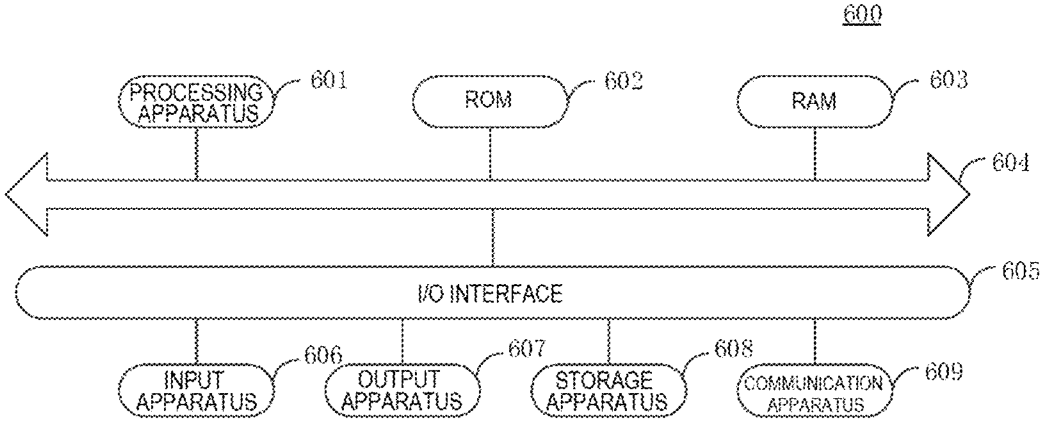
FIG. 6 is a structural schematic diagram of an electronic device provided by an embodiment of the present disclosure.

FIG. 6 is a structural schematic diagram of an electronic device provided by an embodiment of the present disclosure.

Reference is made to FIG. 6, which is a schematic structural diagram of an electronic device 600 suitable for implementing the embodiments of the present disclosure. The electronic device in the embodiments of the present disclosure may include but not limited to mobile terminals such as mobile phones, notebook computers, digital broadcast receivers, PDAs (personal digital assistants), PADs (tablet computers), PMPs (portable multimedia players) and vehicle terminals (such as car navigation terminals); and fixed terminals such as digital TVs and desktop computers. The electronic device shown in FIG. 6 is only an example, and should not limit the functions and application scope of the embodiments of the present disclosure.

As shown in FIG. 6, the electronic device 600 may include a processing apparatus (such as a central processing unit and a graphics processing unit) 601. The processing apparatus 601 can execute various appropriate actions and processes according to programs stored in a read only memory (ROM) 602 or loaded from a storage apparatus 608 into a random-access memory (RAM) 603. In the RAM 603, various programs and data necessary for the operation of the electronic device 600 are also stored. The processing apparatus 601, the ROM 602 and the RAM 603 are connected to each other through a bus 604. An input/output (I/O) interface 605 is also connected to the bus 604.

Generally, the following devices may be connected to the I/O interface 605: input apparatus 606 including, for example, a touch screen, a touch pad, a keyboard, a mouse, a camera, a microphone, an accelerometer, a gyroscope, etc.; output apparatus 607 including, for example, a liquid crystal display (LCD), a speaker, a vibrator, etc.; a storage apparatus 608 including, for example, a magnetic tape, a hard disk, etc.; and a communication apparatus 609. The communication apparatus 609 may allow the electronic device 600 to perform wireless or wired communication with other devices to exchange data. Although FIG. 6 shows the electronic device 600 having various devices, it should be understood that implementing or having all of the devices shown is not a requirement. More or fewer devices may alternatively be implemented or provided.

In particular, according to an embodiment of the present disclosure, the processes described above with reference to the flowcharts may be implemented as computer software programs. For example, embodiments of the present disclosure include a computer program product. The computer program product includes a computer program carried on a non-transitory computer-readable medium. The computer program contains program code for carrying out the methods shown in the flowcharts. In such an embodiment, the computer program may be downloaded and installed from a network via the communication apparatus 609, or from the storage apparatus 608, or from the ROM 602. When the computer program is executed by the processing apparatus 601, the functions defined in the methods of the embodiments of the present disclosure are performed.

It should be noted that the above computer-readable medium in the present disclosure may be a computer-readable signal medium or a computer-readable storage medium or any combination of the above two. The computer readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to: electrical connections with one or more wires, portable computer disks, hard disks, a random-access memory (RAM), a read only memory (ROM), an erasable programmable read-only memory (EPROM or Flash), optical fibers, a compact disk read-only memory (CD-ROM), optical storage devices, magnetic memory components, or any suitable combination of the above. In the present disclosure, the computer-readable storage medium may be any tangible medium that contains or stores a program. The program may be used by or in conjunction with the instruction execution system, apparatus or device. In the present disclosure, however, the computer-readable signal medium may include a data signal propagated in baseband or as part of a carrier wave, and the data signal carries computer-readable program code. Such propagated data signals may be in various forms, including but not limited to electromagnetic signals, optical signals, or any suitable combination of the foregoing. The computer-readable signal medium can also be any computer-readable medium other than the computer-readable storage medium. The computer-readable signal medium may transmit, propagate, or transport a program for use by or in connection with an instruction execution system, apparatus, or device. Program code embodied on the computer-readable medium may be transmitted by any appropriate medium, including but not limited to: wires, optical cables, RF (radio frequency), etc., or any suitable combination of the above.

In some embodiments, a client may communicate with a server using any currently known or future-developed network protocols such as HTTP (Hypertext Transfer Protocol), and the client and the server may be interconnected with digital data communication (e.g., a communication network) of any form or medium. Examples of the communication network include local area networks ("LANs"), wide area networks ("WANs"), internetworks (e.g., the Internet), and peer-to-peer networks (e.g., ad hoc peer-to-peer networks), as well as any currently known or future developed network.

The computer-readable medium may be included in the electronic device, or may exist independently without being incorporated into the electronic device.

The computer-readable medium carries one or more programs, when being executed by the electronic device, causes the electronic device to: determine, based on original feature points of a target object in a previous frame image to a current frame image, target feature points of the target object in the current frame image, for which the original feature points are successfully tracked; determine effective feature points that meet a predetermined filtering condition from the target feature points, and generate a movement estimation model based on the effective feature points; generate a first pose of the target object in the current frame image based on the movement estimation model and pose estimation of the target object in the previous frame image, and extract a second pose of the target object in the current frame image with a predetermined deep learning model; and smooth the first pose and the second pose to generate a third pose of the target object in the current frame image. A third pose is generated based on the first and second pose so that the pose estimation can have good stability and accuracy at the same time, thereby improving the user's experience and satisfaction.

The computer program code for carrying out operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program code may be executed entirely on the user computer, partly on the user computer, as a stand-alone software package, partly on the user computer and partly on a remote computer, or entirely on a remote computer or server. Where a remote computer is involved, the remote computer may be connected to the user computer through any kind of network including a local area network (LAN) or a wide area network (WAN), or may be connected to an external computer (e.g., via the Internet by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagram may represent a module, program segment, or portion of code. The module, program segment, or portion of code contains one or more executable instructions for implementing specified logical functions. It should also be noted that, in some alternative implementations, the functions noted in the blocks may occur in an order different form the order noted in the drawings. For example, two blocks shown in succession could, in fact, be executed substantially concurrently or in a reverse order, depending upon the functionality involved. Further, each block in the block diagrams and/or flow charts, and a combination of blocks in the block diagrams and/or flow diagrams may be performed by a dedicated hardware-based system that performs the specified functions or operations or by a combination of dedicated hardware and computer instructions.

The units involved in the embodiments described in the present disclosure may be implemented by software or by hardware. The name of a unit does not in any way constitute a qualification of the unit itself.

The functions described herein above may be performed at least in part by one or more hardware logic components. For example, without limitation, exemplary hardware logic components that may be used to include: field programmable gate arrays (FPGAs), application specific integrated circuits (ASICs), application specific standard products (ASSPs), system on chips (SOCs), complex programmable logical devices (CPLDs), etc.

In the context of the present disclosure, the machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of the machine-readable storage medium may include one or more wire-based electrical connections, portable computer disks, hard disks, a random-access memory (RAM), a read only memory (ROM), an erasable programmable read only memory (EPROM or flash memory), fiber optics, a compact disk read-only memory (CD-ROM), optical storage devices, magnetic storage devices, or any suitable combination of the foregoing.

According to one or more embodiments of the present disclosure, the present disclosure provides a method for pose estimation, including:

determining, based on original feature points of a target object in a previous frame image to a current frame image, target feature points of the target object in the current frame image, for which the original feature points are successfully tracked;

determining effective feature points that meet a predetermined filtering condition from the target feature points, and generating a movement estimation model based on the effective feature points;

generating a first pose of the target object in the current frame image based on the movement estimation model and pose estimation of the target object in the previous frame image, and extracting a second pose of the target object in the current frame image with a predetermined deep learning model; and smoothing the first pose and the second pose to generate a third pose of the target object in the current frame image.

According to one or more embodiments of the present disclosure, in a method for pose estimation provided by the present disclosure, the determining target feature points of the target object in the current frame image, for which the original feature points are successfully tracked comprises:

tracking the original feature points with a sparse optical flow method, to obtain successfully tracked target feature points.

According to one or more embodiments of the disclosure, in a method for pose estimation provided by the present disclosure, the determining effective feature points that meet a predetermined filtering condition from the target feature points, and generating a movement estimation model based on the effective feature points comprises:

analyzing changes of the target feature points from the previous frame image to the current frame image;

clustering, based on the changes, the target feature points into different feature point sets with different movement directions;

comparing the respective numbers of feature point sets to obtain a target set with a largest number, and determining feature points in the target set as the effective feature points that meet the preset filtering condition; and generating a movement change matrix based on the effective feature points.

According to one or more embodiments of the disclosure, in a method for pose estimation provided by the present disclosure, the generating a first pose of the target object in the current frame image based on the movement estimation model and pose estimation of the target object in the previous frame image comprises:

performing dot multiplication processing to the movement change matrix and the pose estimation of the target object in the previous frame image to generate the first pose of the target object in the current frame image.

According to one or more embodiments of the disclosure, in a method for pose estimation provided by the present disclosure, the smoothing the first pose and the second pose to generate a third pose of the target object in the current frame image comprises:

determining a first smoothing parameter corresponding to the first pose, and determining a second smoothing parameter corresponding to the second pose; and smoothing the first pose and the second pose based on the first smoothing parameter and the second smoothing parameter to generate the third pose of the target object in the current frame image.

According to one or more embodiments of the disclosure, in a method for pose estimation provided by the present disclosure, the determining a first smoothing parameter corresponding to the first pose, and determining a second smoothing parameter corresponding to the second pose comprises:

deciding whether the target feature points meet a predetermined first effective condition;

when the target feature points meet the first effective condition, deciding whether the effective feature points meet a second effective condition; and when the effective feature points meet the second effective condition, determining the first smoothing parameter as a first coefficient and determining the second smoothing parameter as a second coefficient, wherein the first coefficient is greater than the second coefficient, and a difference value of the first coefficient minus the second coefficient is greater than a predetermined threshold.

According to one or more embodiments of the present disclosure, a method for pose estimation provided by the present disclosure further comprises:

when the target feature points do not meet the first effective condition, determining the first smoothing parameter as a third coefficient and determining the second smoothing parameter as a fourth coefficient, wherein the third coefficient is less than the fourth coefficient, and a difference value of the fourth coefficient minus the third coefficient is greater than the predetermined threshold.

According to one or more embodiments of the present disclosure, a method for pose estimation provided by the present disclosure further comprises:

when the target feature points meet the first effective condition and the effective feature points do not meet the second effective condition, determining the first smoothing parameter as a fifth coefficient and determining the second smoothing parameter as a sixth coefficient, wherein an absolute value of a difference between the fifth coefficient and the sixth coefficient is less than the predetermined threshold.

According to one or more embodiments of the disclosure, in a method for pose estimation provided by the present disclosure, the deciding whether the target feature points meet a predetermined first effective condition comprises:

comparing the number of the target feature points with a predetermined first threshold;

if the number of the target feature points is greater than or equal to the first threshold, determining that the first effective condition is met;

if the number of the target feature points is less than the first threshold, determining that the first effective condition is not met.

According to one or more embodiments of the present disclosure, in a method for pose estimation provided by the present disclosure, the deciding whether the target feature points meet a predetermined first effective condition comprises:

calculating a first ratio of the number of the target feature points to the number of the original feature points, and comparing the first ratio with a predetermined second threshold;

if the first ratio is greater than or equal to the second threshold, determining that the first effective condition is met; and if the first ratio is less than the second threshold, determining that the first effective condition is not met.

According to one or more embodiments of the present disclosure, in a method for pose estimation provided by the present disclosure, the deciding whether the effective feature points meet a second effective condition comprises:

comparing the number of the effective feature points with a predetermined third threshold;

if the number of the effective feature points is greater than or equal to the third threshold, determining that the second effective condition is met; and if the number of the effective feature points is less than the third threshold, determining that the second effective condition is not met.

According to one or more embodiments of the present disclosure, in a method for pose estimation provided by the present disclosure, the deciding whether the effective feature points meet a second effective condition comprises:

calculating a second ratio of the number of the effective feature points to the number of the target feature points, and comparing the second ratio with a predetermined fourth threshold;

if the second ratio is greater than or equal to the fourth threshold, determining that the second effective condition is met; and if the second ratio is less than the fourth threshold, determining that the second effective condition is not met.

According to one or more embodiments of the present disclosure, the present disclosure provides an apparatus for pose estimation, comprising:

a determining module, configured to determine, based on original feature points of a target object in a previous frame image to a current frame image, target feature points of the target object in the current frame image, for which the original feature points are successfully tracked;

a filtering module, configured to determine effective feature points that meet a predetermined filtering condition from the target feature points, and generate a movement estimation model based on the effective feature points;

a first generating module, configured to generate a first pose of the target object in the current frame image based on the movement estimation model and pose estimation of the target object in the previous frame image, and extract a second pose of the target object in the current frame image with a predetermined deep learning model;

a second generating module, configured to smooth the first pose and the second pose to generate a third pose of the target object in the current frame image.

According to one or more embodiments of the present disclosure, in the apparatus for pose estimation provided by the present disclosure, the determining module is configured to:

track the original feature points with a sparse optical flow method, to obtain successfully tracked target feature points.

According to one or more embodiments of the present disclosure, in the apparatus for pose estimation provided by the present disclosure, the filtering module is configured to:

analyze changes of the target feature points from the previous frame image to the current frame image;

cluster, based on the changes, the target feature points into different feature point sets with different movement directions;

compare the respective numbers of feature point sets to obtain a target set with a largest number, and determine feature points in the target set as the effective feature points that meet the preset filtering condition;

generate a movement change matrix based on the effective feature points.

According to one or more embodiments of the present disclosure, in the apparatus for pose estimation provided by the present disclosure, the first generating module is configured to:

perform dot multiplication processing to the movement change matrix and the pose estimation of the target object in the previous frame image to generate the first pose of the target object in the current frame image.

According to one or more embodiments of the present disclosure, in the apparatus for pose estimation provided by the present disclosure, the second generating module includes:

a determining unit, configured to determine a first smoothing parameter corresponding to the first pose, and determine a second smoothing parameter corresponding to the second pose;

a generating unit, configured to smooth the first pose and the second pose based on the first smoothing parameter and the second smoothing parameter to generate the third pose of the target object in the current frame image.

According to one or more embodiments of the disclosure, in the apparatus for pose estimation provided by the present disclosure, the determining unit is configured to:

decide whether the target feature points meet a predetermined first effective condition;

when the target feature points meet the first effective condition, decide whether the effective feature points meet a second effective condition;

when the effective feature points meet the second effective condition, determine the first smoothing parameter as a first coefficient and determine the second smoothing parameter as a second coefficient, wherein the first coefficient is greater than the second coefficient, and a difference value of the first coefficient minus the second coefficient is greater than a predetermined threshold.

According to one or more embodiments of the present disclosure, in the apparatus for pose estimation provided by the present disclosure, the determining unit is further configured to:

when the target feature points do not meet the first effective condition, determine the first smoothing parameter as a third coefficient and determine the second smoothing parameter as a fourth coefficient, wherein the third coefficient is less than the fourth coefficient, and a difference value of the fourth coefficient minus the third coefficient is greater than the predetermined threshold.

According to one or more embodiments of the present disclosure, in the apparatus for pose estimation provided by the present disclosure, the determining unit is further configured to:

when the target feature points meet the first effective condition and the effective feature points do not meet the second effective condition, determine the first smoothing parameter as a fifth coefficient and determine the second smoothing parameter as a sixth coefficient, wherein an absolute value of a difference between the fifth coefficient and the sixth coefficient is less than the predetermined threshold.

According to one or more embodiments of the disclosure, in the apparatus for pose estimation provided by the present disclosure, the determining unit is configured to:

compare the number of the target feature points with a predetermined first threshold;

if the number of the target feature points is greater than or equal to the first threshold, determine that the first effective condition is met;

if the number of the target feature points is less than the first threshold, determine that the first effective condition is not met.

According to one or more embodiments of the present disclosure, in the apparatus for pose estimation provided by the present disclosure, the determining unit is configured to:

calculate a first ratio of the number of the target feature points to the number of the original feature points, and compare the first ratio with a predetermined second threshold;

if the first ratio is greater than or equal to the second threshold, determine that the first effective condition is met;

if the first ratio is less than the second threshold, determine that the first effective condition is not met.

According to one or more embodiments of the disclosure, in the apparatus for pose estimation provided by the present disclosure, the determining unit is configured to:

compare the number of the effective feature points with a predetermined third threshold;

if the number of the effective feature points is greater than or equal to the third threshold, determine that the second effective condition is met;

if the number of the effective feature points is less than the third threshold, determine that the second effective condition is not met.

According to one or more embodiments of the present disclosure, in the apparatus for pose estimation provided by the present disclosure, the determining unit is configured to:

calculate a second ratio of the number of the effective feature points to the number of the target feature points, and compare the second ratio with a predetermined fourth threshold;

if the second ratio is greater than or equal to the fourth threshold, determine that the second effective condition is met; and if the second ratio is less than the fourth threshold, determine that the second effective condition is not met.

According to one or more embodiments of the disclosure, the disclosure provides an electronic device, comprising:

a processor;

a memory, configured to store processor executable instructions;

the processor is configured to read the executable instructions from the memory and execute the instructions to implement any of the methods for pose estimation provided by the present disclosure.

According to one or more embodiments of the disclosure, the present disclosure provides a computer-readable storage medium, wherein the computer-readable storage medium stores computer programs which are used to execute any of the methods for pose estimation provided by the present disclosure.

According to one or more embodiments of the disclosure, the present disclosure provides a computer program product that includes a computer program/instruction that, when executed by a processor, implements any of the methods for pose estimation provided by the present disclosure.

Only preferred embodiments of the present disclosure and an illustration of the applied technical principle are described above. Those skilled in the art should understand that, the scope of the present disclosure is not limited to the technical solution formed by specific combinations of the above technical features, but also covers other technical solutions formed by any combination of the above technical features or their equivalent features without departing from the above disclosed concept, for example, a technical solution formed by replacing the above features with technical features with similar functions disclosed in (but not limited to) the present disclosure.

In addition, although operations are described in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to structural features and/or logical actions of methods, it should be understood that the subject matter defined in the appended claims is not limited to the specific features or actions described above. On the contrary, the specific features and actions described above are only exemplary forms of implementing the claims.

We claim:

1. A method for pose estimation, comprising:

determining, based on original feature points of a target object in a previous frame image to a current frame image, target feature points of the target object in the current frame image, for which the original feature points are successfully tracked;

determining effective feature points that meet a predetermined filtering condition from the target feature points, and generating a movement estimation model based on the effective feature points, wherein the movement estimation model is configured to represent a pose transformation relationship of the target object from the previous frame image to the current frame image;

generating a first pose of the target object in the current frame image based on the movement estimation model and pose estimation of the target object in the previous frame image, and extracting a second pose of the target object in the current frame image with a predetermined deep learning model; and performing, based on at least one smoothing parameter, a smoothing operation on the first pose and the second pose to generate a third pose of the target object in the current frame image, wherein the at least one smoothing parameter is determined based on a quality level of the first pose generated by the movement estimation model and a precision level of the pose estimation in the previous frame image.

2. The method according to claim 1, wherein determining target feature points of the target object in the current frame image, for which the original feature points are successfully tracked comprises:

tracking the original feature points with a sparse optical flow method, to obtain successfully tracked target feature points.

3. The method according to claim 1, wherein determining effective feature points that meet a predetermined filtering condition from the target feature points, and generating a movement estimation model based on the effective feature points comprises:

analyzing changes of the target feature points from the previous frame image to the current frame image;

clustering, based on the changes, the target feature points into different feature point sets with different movement directions;

comparing the respective numbers of feature point sets to obtain a target set with a largest number, and determining feature points in the target set as the effective feature points that meet the preset filtering condition; and generating a movement change matrix based on the effective feature points.

4. The method according to claim 3, wherein generating a first pose of the target object in the current frame image based on the movement estimation model and pose estimation of the target object in the previous frame image comprises:

performing matrix multiplication to the movement change matrix and the pose estimation of the target object in the previous frame image to generate the first pose of the target object in the current frame image.

5. The method according to claim 1, wherein smoothing the first pose and the second pose to generate a third pose of the target object in the current frame image comprises:

determining a first smoothing parameter corresponding to the first pose, and determining a second smoothing parameter corresponding to the second pose; and smoothing the first pose and the second pose based on the first smoothing parameter and the second smoothing parameter to generate the third pose of the target object in the current frame image.

6. The method according to claim 5, wherein determining a first smoothing parameter corresponding to the first pose, and determining a second smoothing parameter corresponding to the second pose comprises:

deciding whether the target feature points meet a predetermined first effective condition;

when the target feature points meet the first effective condition, deciding whether the effective feature points meet a second effective condition; and when the effective feature points meet the second effective condition, determining the first smoothing parameter as a first coefficient and determining the second smoothing parameter as a second coefficient, wherein the first coefficient is greater than the second coefficient, and a difference value of the first coefficient minus the second coefficient is greater than a predetermined threshold.

7. The method according to claim 6, further comprising:

when the target feature points do not meet the first effective condition, determining the first smoothing parameter as a third coefficient and determining the second smoothing parameter as a fourth coefficient, wherein the third coefficient is less than the fourth coefficient, and a difference value of the fourth coefficient minus the third coefficient is greater than the predetermined threshold.

8. The method according to claim 6, further comprising:

when the target feature points meet the first effective condition and the effective feature points do not meet the second effective condition, determining the first smoothing parameter as a fifth coefficient and determining the second smoothing parameter as a sixth coefficient, wherein an absolute value of a difference between the fifth coefficient and the sixth coefficient is less than the predetermined threshold.

9. The method according to claim 6, the deciding whether the target feature points meet a predetermined first effective condition comprises:

comparing the number of the target feature points with a predetermined first threshold;

if the number of the target feature points is greater than or equal to the first threshold, determining that the first effective condition is met; and if the number of the target feature points is less than the first threshold, determining that the first effective condition is not met.

10. The method according to claim 6, the deciding whether the target feature points meet a predetermined first effective condition comprises:

calculating a first ratio of the number of the target feature points to the number of the original feature points, and comparing the first ratio with a predetermined second threshold;

if the first ratio is greater than or equal to the second threshold, determining that the first effective condition is met; and if the first ratio is less than the second threshold, determining that the first effective condition is not met.

11. The method according to claim 6, the deciding whether the effective feature points meet a second effective condition comprises:

comparing the number of the effective feature points with a predetermined third threshold;

if the number of the effective feature points is greater than or equal to the third threshold, determining that the second effective condition is met; and if the number of the effective feature points is less than the third threshold, determining that the second effective condition is not met.

12. The method according to claim 6, the deciding whether the effective feature points meet a second effective condition comprises:

calculating a second ratio of the number of the effective feature points to the number of the target feature points, and comparing the second ratio with a predetermined fourth threshold;

if the second ratio is greater than or equal to the fourth threshold, determining that the second effective condition is met; and if the second ratio is less than the fourth threshold, determining that the second effective condition is not met.

13. An electronic device, wherein the electronic device comprises:

a processor;

a memory, configured to store processor executable instructions; and the processor is configured to read the executable instructions from the memory and execute the instructions to perform operations comprising:

determining, based on original feature points of a target object in a previous frame image to a current frame image, target feature points of the target object in the current frame image, for which the original feature points are successfully tracked;

determining effective feature points that meet a predetermined filtering condition from the target feature points, and generating a movement estimation model based on the effective feature points, wherein the movement estimation model is configured to represent a pose transformation relationship of the target object from the previous frame image to the current frame image;

generating a first pose of the target object in the current frame image based on the movement estimation model and pose estimation of the target object in the previous frame image, and extracting a second pose of the target object in the current frame image with a predetermined deep learning model; and performing, based on at least one smoothing parameter, a smoothing the first pose and the second pose to generate a third pose of the target object in the current frame image, wherein the at least one smoothing parameter is determined based on a quality level of the first pose generated by the movement estimation model and a precision level of the pose estimation in the previous frame image.

14. The electronic device according to claim 13, wherein determining target feature points of the target object in the current frame image, for which the original feature points are successfully tracked comprises:

tracking the original feature points with a sparse optical flow method, to obtain successfully tracked target feature points.

15. The electronic device according to claim 13, wherein determining effective feature points that meet a predetermined filtering condition from the target feature points, and generating a movement estimation model based on the effective feature points comprises:

analyzing changes of the target feature points from the previous frame image to the current frame image;

clustering, based on the changes, the target feature points into different feature point sets with different movement directions;

comparing the respective numbers of feature point sets to obtain a target set with a largest number, and determining feature points in the target set as the effective feature points that meet the preset filtering condition; and generating a movement change matrix based on the effective feature points.

16. The electronic device according to claim 15, wherein generating a first pose of the target object in the current frame image based on the movement estimation model and pose estimation of the target object in the previous frame image comprises:

performing matrix multiplication to the movement change matrix and the pose estimation of the target object in the previous frame image to generate the first pose of the target object in the current frame image.

17. The electronic device according to claim 13, wherein smoothing the first pose and the second pose to generate a third pose of the target object in the current frame image comprises:

determining a first smoothing parameter corresponding to the first pose, and determining a second smoothing parameter corresponding to the second pose; and smoothing the first pose and the second pose based on the first smoothing parameter and the second smoothing parameter to generate the third pose of the target object in the current frame image.

18. The electronic device according to claim 17, wherein determining a first smoothing parameter corresponding to the first pose, and determining a second smoothing parameter corresponding to the second pose comprises:

deciding whether the target feature points meet a predetermined first effective condition;

when the target feature points meet the first effective condition, deciding whether the effective feature points meet a second effective condition; and when the effective feature points meet the second effective condition, determining the first smoothing parameter as a first coefficient and determining the second smoothing parameter as a second coefficient, wherein the first coefficient is greater than the second coefficient, and a difference value of the first coefficient minus the second coefficient is greater than a predetermined threshold.

19. The electronic device according to claim 18, wherein the operations further comprise:

when the target feature points do not meet the first effective condition, determining the first smoothing parameter as a third coefficient and determining the second smoothing parameter as a fourth coefficient, wherein the third coefficient is less than the fourth coefficient, and a difference value of the fourth coefficient minus the third coefficient is greater than the predetermined threshold.

20. A non-transitory computer-readable storage medium, wherein the computer readable-storage medium stores instructions which, when ran on a terminal device, cause the terminal device to perform operations comprising:

determining, based on original feature points of a target object in a previous frame image to a current frame image, target feature points of the target object in the current frame image, for which the original feature points are successfully tracked;

determining effective feature points that meet a predetermined filtering condition from the target feature points, and generating a movement estimation model based on the effective feature points, wherein the movement estimation model is configured to represent a pose transformation relationship of the target object from the previous frame image to the current frame image;

generating a first pose of the target object in the current frame image based on the movement estimation model and pose estimation of the target object in the previous frame image, and extracting a second pose of the target object in the current frame image with a predetermined deep learning model; and performing, based on at least one smoothing parameter, a smoothing the first pose and the second pose to generate a third pose of the target object in the current frame image, wherein the at least one smoothing parameter is determined based on a quality level of the first pose generated by the movement estimation model and a precision level of the pose estimation in the previous frame image.

* * * * *